United States Patent
Yamaguchi et al.

(10) Patent No.: US 10,355,740 B2
(45) Date of Patent: Jul. 16, 2019

(54) ARRAY ANTENNA DEVICE AND CALIBRATION METHOD THEREFOR

(71) Applicant: MITSUBISHI ELECTRIC CORPORATION, Chiyoda-ku (JP)

(72) Inventors: Satoshi Yamaguchi, Chiyoda-ku (JP); Hikaru Watanabe, Chiyoda-ku (JP); Tasuku Kuriyama, Chiyoda-ku (JP); Takashi Maruyama, Chiyoda-ku (JP); Masataka Otsuka, Chiyoda-ku (JP); Hideki Morishige, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/076,787

(22) PCT Filed: Feb. 21, 2017

(86) PCT No.: PCT/JP2017/006293
§ 371 (c)(1),
(2) Date: Aug. 9, 2018

(87) PCT Pub. No.: WO2017/146020
PCT Pub. Date: Aug. 31, 2017

(65) Prior Publication Data
US 2019/0044568 A1 Feb. 7, 2019

(30) Foreign Application Priority Data

Feb. 23, 2016 (WO) .................. PCT/JP2016/055212

(51) Int. Cl.
*H04B 1/44* (2006.01)
*H04B 17/00* (2015.01)
(Continued)

(52) U.S. Cl.
CPC .................. *H04B 1/44* (2013.01); *H01Q 3/26* (2013.01); *H01Q 21/0025* (2013.01); *H04B 7/0691* (2013.01); *H04B 17/12* (2015.01)

(58) Field of Classification Search
CPC .... H01Q 3/267; H01Q 21/00; H01Q 21/0025; H01Q 21/06; H04B 1/04; H04B 1/16;
(Continued)

(56) References Cited

U.S. PATENT DOCUMENTS 7,102,569 B2 * 9/2006 Tan .................. H01Q 3/267
455/67.11
7,292,877 B2 * 11/2007 Yoon .................. H01Q 3/267
455/67.11

(Continued)

FOREIGN PATENT DOCUMENTS

JP          4478606 B2    6/2010

OTHER PUBLICATIONS

International Search Report dated Apr. 25, 2017 in PCT/JP2017/006293 filed Feb. 21, 2017.

*Primary Examiner* — Quochien B Vuong
(74) *Attorney, Agent, or Firm* — Oblon, McClelland, Maier & Neustadt, L.L.P.

(57) ABSTRACT

An array antenna device AAD including: a plurality of element antennas EAs; a transmission/reception module TRM, which is to be connected to one of the EAs, and includes a transmission circuit TC, a reception circuit RC, and a transmission/reception switch; a transmission/reception controller controlling by controlling an amplitude and phase of a signal passing through each TC and RC, and by switching transmission/reception; a distributor distributing a signal from a signal transmitter to each TC to transmit a distributed signal from the each TC; a combiner combining a signal from the each RC; and a receiver receiving the combined signal. A detection signal, which contains a (Continued)

detected amplitude and phase of the signal received by the receiver, is corrected with a piece of interconnection amplitude-phase information about the EAs to obtain a calibration value in calibration of each TRM, and calibration is conducted with the calibration value.

15 Claims, 9 Drawing Sheets

(51) Int. Cl.
   *H01Q 3/26* (2006.01)
   *H04B 17/12* (2015.01)
   *H01Q 21/00* (2006.01)
   *H04B 7/06* (2006.01)

(58) Field of Classification Search
   CPC . H04B 1/40; H04B 1/44; H04B 7/069; H04B 7/0413; H04B 17/00; H04B 17/10; H04B 17/11; H04B 17/12; H04B 17/14; H04B 17/18; H04B 17/19; H04B 17/20; H04B 17/21; H04B 7/04
   USPC .................. 455/67.11, 78, 79, 83, 423, 424
   See application file for complete search history.

(56) References Cited

U.S. PATENT DOCUMENTS

| | | | |
|---|---|---|---|
| 9,094,254 B2 * | 7/2015 | Da Silveira | H04L 25/03949 |
| 9,300,408 B2 * | 3/2016 | Katipally | H01Q 3/267 |
| 9,866,336 B2 * | 1/2018 | Geis | H01Q 3/267 |
| 10,103,431 B2 * | 10/2018 | Swirhun | H01Q 3/267 |
| 10,128,894 B1 * | 11/2018 | O'Brien | H04B 17/14 |
| 2003/0054790 A1 * | 3/2003 | Sanada | H04B 7/084 |
| | | | 455/334 |

* cited by examiner

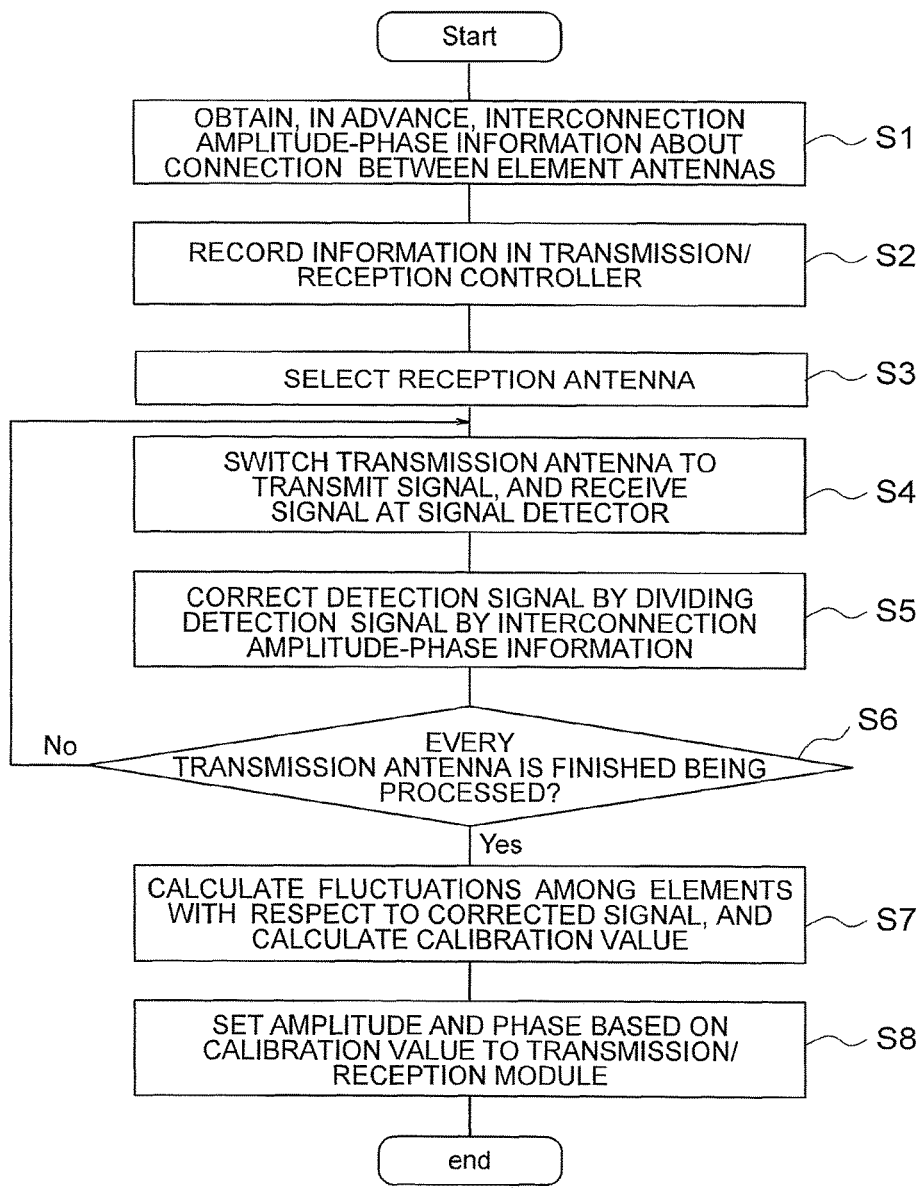

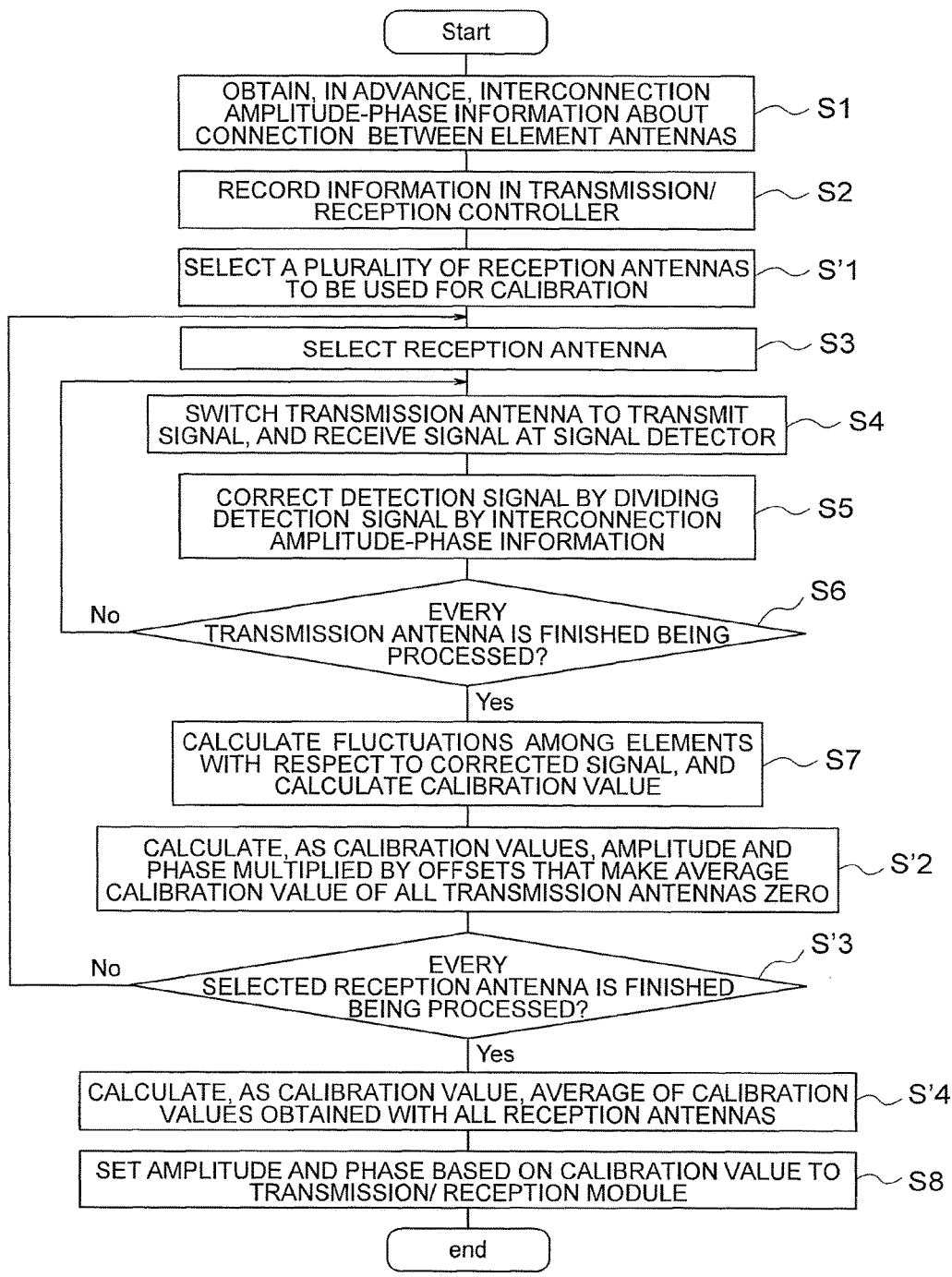

ARRAY ANTENNA DEVICE AND CALIBRATION METHOD THEREFOR

TECHNICAL FIELD

The present invention relates to an array antenna device to be used in radars, wireless communication, and other applications, and a method of calibrating the array antenna device.

BACKGROUND ART

In phased array antennas, a beam can be scanned electronically, that is, by electrical control of an element antenna, with an array antenna device physically fixed. The phased array antennas are therefore capable of quick beam control and multi-beam forming among others. Applications of phased array antennas accordingly include radars and wireless communication. In order to form a desired beam, it is important to calibrate initial fluctuations of a transmission circuit and reception circuit included in each element antenna.

An array antenna device is calibrated usually in an anechoic chamber or at a similar test station with the use of a measuring instrument. A calibration-use antenna is set up at a given distance from the array antenna device so as to face the array antenna device. Calibration is then conducted by connecting the array antenna device and the calibration-use antenna to the measuring instrument. In the case of the calibration of a transmission circuit in the array antenna device, for example, the calibration-use antenna sequentially receives signals transmitted from element antennas, which make up the array antenna device. The signals are detected by the measuring instrument, an arithmetic unit then calculates fluctuations among the signals, and calibration is conducted so as to compensate for the fluctuations. However, equipment investment of the calibration is costly because an anechoic chamber is usually large-scale equipment and the measuring instrument is generally expensive.

Another calibration method in which no calibration-use antenna is positioned so as to face an array antenna device is presented in, for example, Patent Literature 1. This method involves setting up a calibration-use antenna on each side of a linear array antenna to be calibrated, and conducting calibration based on information about signal exchange between the linear array antenna and each calibration-use antenna. The method does not require an anechoic chamber, a measuring instrument, and other pieces of equipment, and accordingly makes it easy to calibrate an array antenna device.

CITATION LIST

Patent Literature

[PTL 1] JP 4478606 B2

SUMMARY OF INVENTION

Technical Problem

In Patent Literature 1, the calibration-use antennas, which are set up separately from the linear array antenna to be calibrated, require a dedicated area. The configuration of Patent Literature 1, in which a reception calibration antenna is set up for a transmission linear array antenna and a transmission calibration antenna is set up for a reception linear array antenna, also limits the linear array antenna to be calibrated to a linear array antenna dedicated to transmission or a linear array antenna dedicated to reception, and cannot be applied to a transmission/reception array antenna. Patent Literature 1 is further limited to linearly aligned array antennas, and is not applicable to, for example, planar array antennas commonly used in such applications as radars and wireless communication.

In addition, there is no consideration for amplitude correction in Patent Literature 1, in which differences in distance from the calibration-use antenna among the element antennas in the linear array antenna are accommodated by correcting only the phase via theoretical calculation from the wavelength and the distance. Another problem is that the phase cannot be corrected properly with a value calculated theoretically from the wavelength and the distance in planar array antennas in which element antennas are aligned in various ways including an electric field plane direction, a magnetic field plane direction, and an oblique direction.

The present invention has been made to solve the problems described above, and an object of the present invention is therefore to provide an array antenna device including an array antenna and a transmission/reception circuit and being configured to conduct calibration on its own, which is capable of correcting an amplitude and a phase properly, and a method of calibrating the array antenna device.

Solution to Problem

According to one embodiment of the present invention, there is provided, for example, an array antenna device including: a plurality of element antennas; a transmission/reception module, which is provided for each of the plurality of element antennas, and includes a transmission circuit, a reception circuit, and a transmission-reception switching switch; a signal transmitter configured to generate a signal to be transmitted; a distributor configured to distribute the signal output from the signal transmitter to each transmission circuit; a combiner configured to combine a signal received by each reception circuit; a receiver configured to receive the signal combined by the combiner, the receiver including a signal detector configured to detect an amplitude and phase of the received signal; and a transmission/reception controller configured to: perform transmission/reception control by controlling an amplitude and phase of a signal passing through the transmission circuit and the reception circuit in each transmission/reception module based on a desired control signal, and by switching between transmission and reception; and calibrate the transmission circuit and the reception circuit in amplitude and in phase based on a calibration value of the transmission/reception module, the calibration value being obtained by correcting a detection signal from the signal detector with a piece of interconnection amplitude-phase information about a space between the plurality of element antennas in calibration of the transmission/reception module.

Advantageous Effects of Invention

According to one embodiment of the present invention, it is possible to provide the array antenna device including the array antenna and the transmission/reception circuit and being configured to conduct calibration on its own, which is capable of correcting the amplitude and the phase properly, and a method of calibrating the array antenna device.

BRIEF DESCRIPTION OF DRAWINGS

FIG. 10 is a schematic operation flow chart for illustrating an example of how the array antenna devices according to the first to third embodiments of the present invention operate to conduct calibration.

FIG. 11 is a schematic operation flow chart for illustrating an example of how an array antenna device according to a fourth embodiment of the present invention operates to conduct calibration.

DESCRIPTION OF EMBODIMENTS

Now, an array antenna device and a calibration method therefor according to each of embodiments of the present invention are described with reference to the drawings. In each of the embodiments, the same or corresponding portions are denoted by the same reference symbols, and the overlapping description thereof is omitted.

First Embodiment

Figure 1:
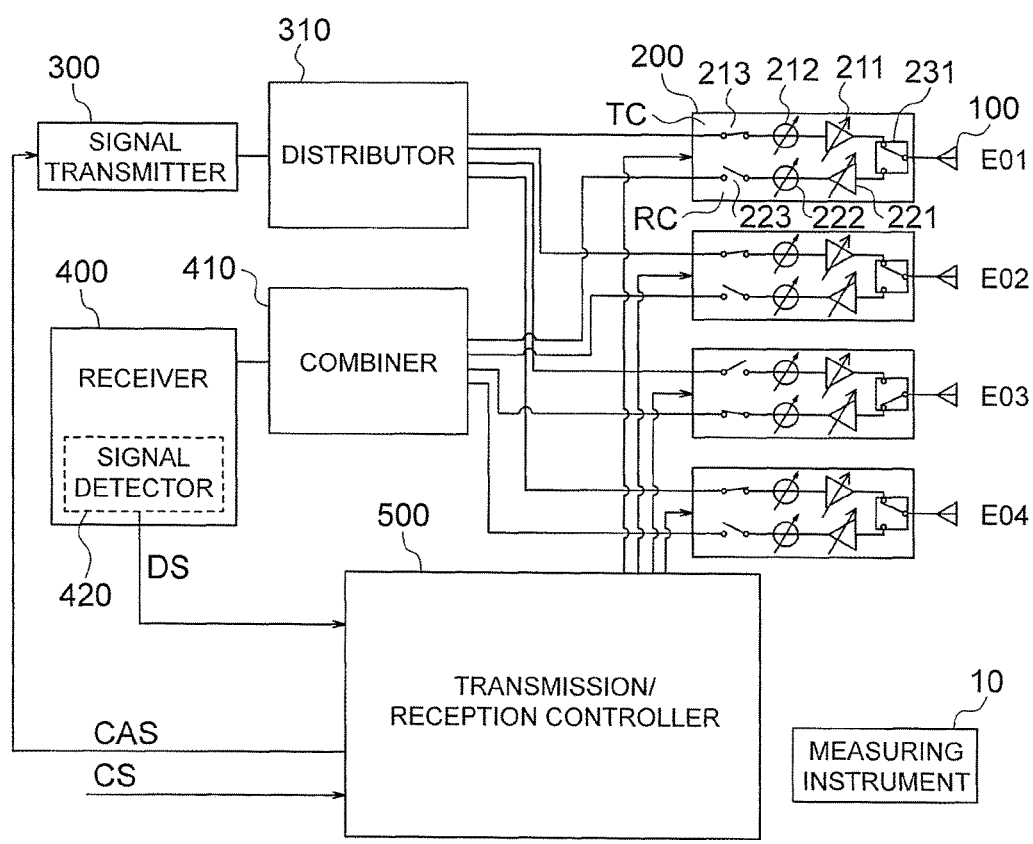
FIG. 1 is a schematic diagram for illustrating the configuration of an array antenna device according to a first embodiment of the present invention in the case of transmission circuit calibration.
Figure 2:
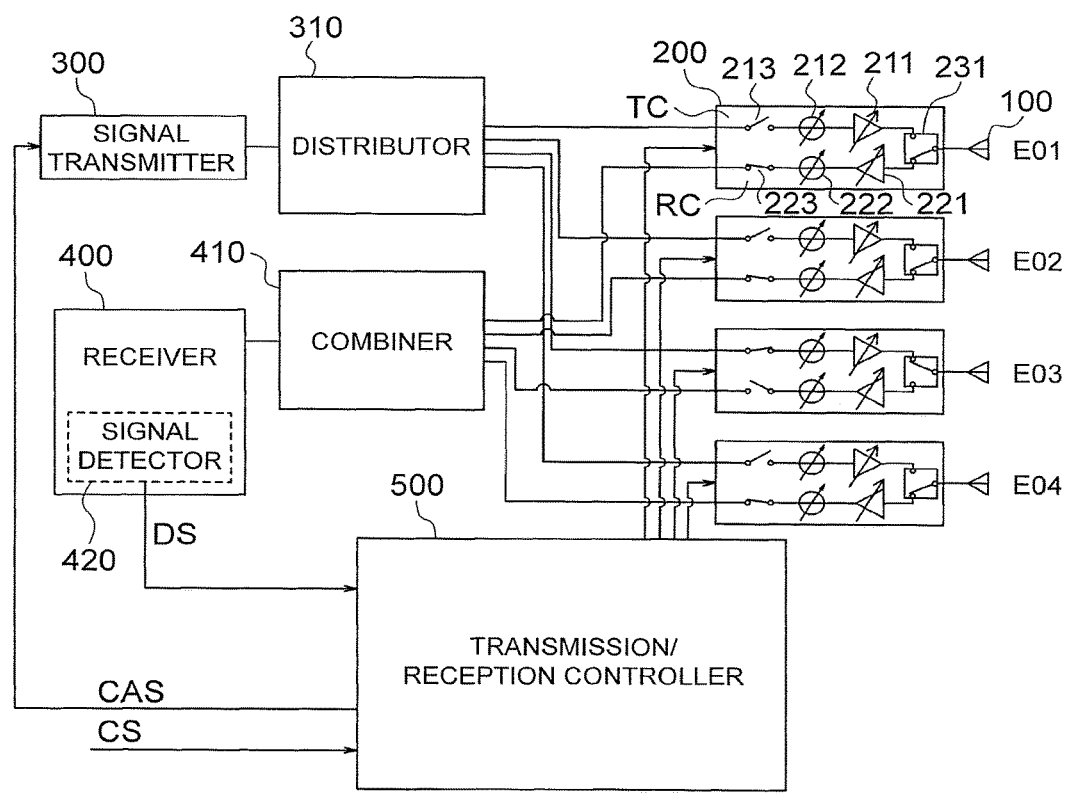
FIG. 2 is a schematic diagram for illustrating the configuration of the array antenna device according to the first embodiment of the present invention in the case of reception circuit calibration.

FIG. 1 and FIG. 2 are each a diagram for schematically illustrating the configuration of an array antenna device according to a first embodiment of the present invention.

A transmission/reception module 200 is connected to each element antenna 100. In each transmission/reception module 200, a transmission circuit TC is made up of a transmission amplifier 211 capable of varying an amplification factor, a transmission phase shifter 212, and a transmission operation switching switch 213, which is an operation switching switch configured to switch between operation and non-operation. A reception circuit RC in each transmission/reception module 200 is made up of a reception amplifier 221 capable of varying an amplification factor, a reception phase shifter 222, and a reception operation switching switch 223, which is an operation switching switch configured to switch between operation and non-operation. A transmission-reception switching switch 231, which is a transmission-reception switching switch, is provided at a point that is between the element antenna 100 and the transmission circuit TC and between the element antenna 100 and the reception circuit RC.

A signal from a signal transmitter 300 is distributed by a distributor 310 to be supplied to the respective transmission/reception modules 200. Reception signals received by the respective transmission/reception modules 200 are combined by a combiner 410, and the resultant signal is sent to a receiver 400. In the illustrated array antenna device, high frequency signals are exchanged among the element antennas 100, the transmission/reception modules 200, the signal transmitter 300, the distributor 310, the receiver 400, and the combiner 410. While the element antennas 100 schematically illustrated in FIG. 1 are aligned linearly, the same applies to the case in which the element antennas are aligned in a planar pattern.

Figure 6:
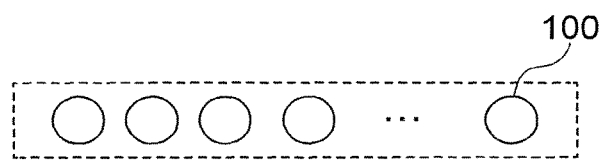
FIG. 6 is a front view for illustrating an example of element antenna alignment in an array antenna device according to the present invention.
Figure 7:
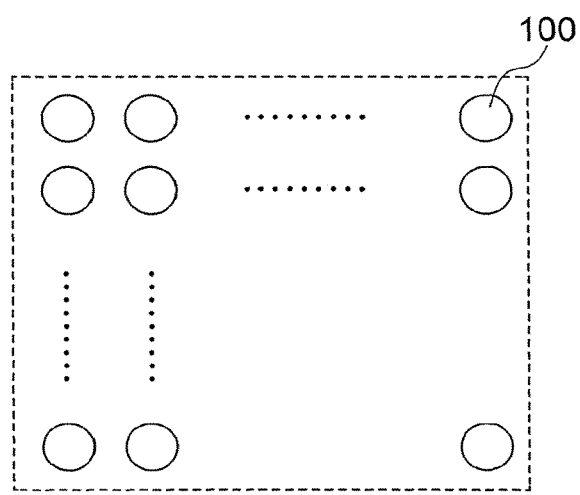
FIG. 7 is a front view for illustrating another example of element antenna alignment in an array antenna device according to the present invention.

FIG. 6 and FIG. 7 are each a front view viewed from, for example, the right-hand side of FIG. 1 in order to illustrate an example of the alignment of the element antennas 100. In the case illustrated in FIG. 6, the element antennas 100 are aligned linearly as illustrated in, for example, FIG. 1 described below. In the case illustrated in FIG. 7, the element antennas 100 are aligned vertically and horizontally in a planar pattern. The number of element antennas is four in the description given below for the sake of convenience of the description, but is not limited thereto. It is sufficient if a plurality of element antennas are aligned.

The receiver 400 includes a signal detector 420, which detects the amplitude and phase of a signal received by the array antenna device. The result of detection by the signal detector 420 is input as a detection signal to a transmission/reception controller 500.

Figure 8:
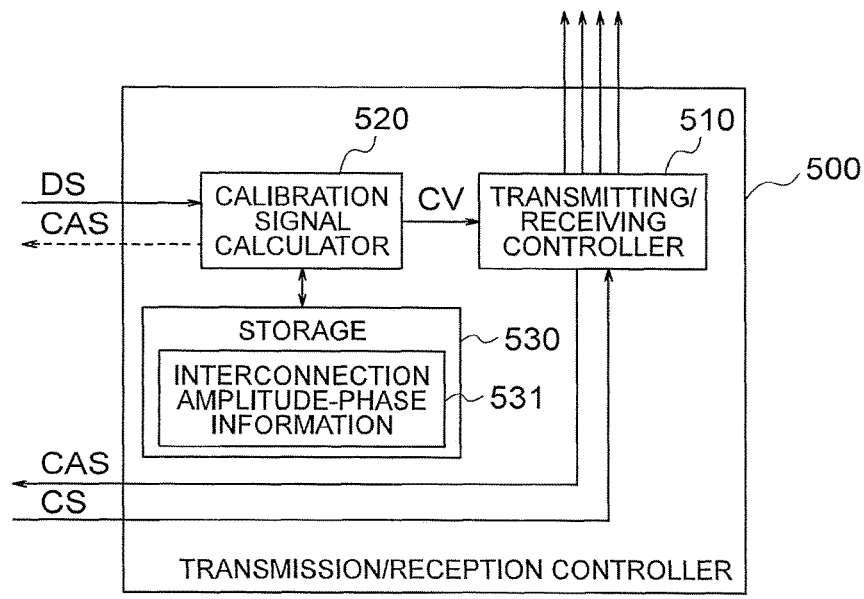
FIG. 8 is a function block diagram of a transmission/reception controller of an array antenna device according to the present invention.

The transmission/reception controller 500 is a controller of the array antenna device. FIG. 8 is a schematic function block diagram of the transmission/reception controller 500. The transmission/reception controller 500 of FIG. 8 includes a transmitting/receiving controller 510, a calibration signal calculator 520, and a storage 530.

Figure 9:
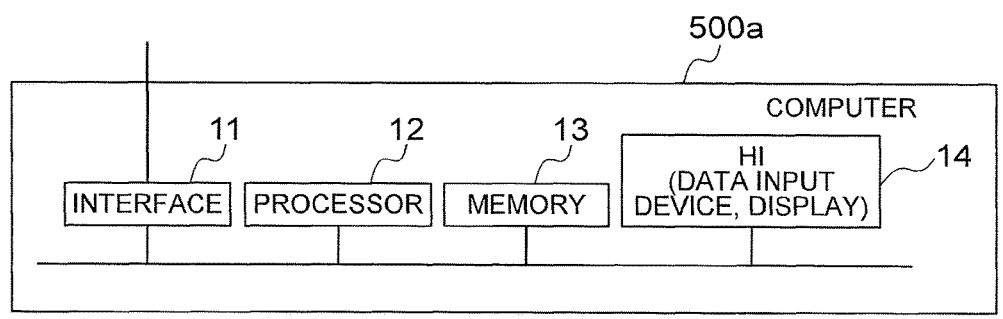
FIG. 9 is a diagram for illustrating an example of a hardware configuration adopted when the transmission/reception controller of an array antenna device according to the present invention is configured from a computer.

FIG. 9 is a diagram for illustrating an example of a hardware configuration in which the transmission/reception controller 500 is configured from a computer, for example. The transmission/reception controller 500 configured as a computer 500a receives input of, and outputs, data and other signals from/to the signal transmitter 300, the receiver 400, the transmission/reception modules 200, and other devices (not shown) via an interface 11. A memory 13 stores, for example, programs of functions illustrated as the function blocks in FIG. 8, and data used for control processing. The data used for control processing here is interconnection amplitude-phase information 531, which is stored in the storage 530 illustrated in FIG. 8. A processor 12 performs arithmetic processing on a signal input via the interface 11 from the outside, as indicated by the programs and data stored in the memory 13, and outputs the result of the arithmetic processing via the interface 11. A human interface (HI) 14 includes a data input device, a display, and the like for a worker. Data is input through the HI 14 as required and the state of the array antenna device is monitored on the display. The memory 13 is equivalent to the storage 530 of FIG. 8.

The transmission/reception controller 500 may also be configured from, for example, a digital circuit provided for each of the function blocks illustrated in FIG. 8.

In FIG. 8, a detection signal DS from the signal detector 420 is input to the calibration signal calculator 520. A calibration value CV, which is the result of calculation in the calibration signal calculator 520, is sent to the transmitting/receiving controller 510. In the calibration of the array antenna device, the calibration signal calculator 520 corrects the detection signal from the signal detector 420 based on a piece of interconnection amplitude-phase information that is associated with the element antennas 100 between which a signal is transmitted/received during calibration operation, out of the interconnection amplitude-phase information 531 stored in advance in the storage 530. The calibration value CV is further obtained in order to compensate for a gap between the corrected value and a set value. The transmitting/receiving controller 510 calibrates the transmission circuit TC and the reception circuit RC in amplitude and in phase based on the calibration value CV obtained in the calibration signal calculator 520. The array antenna device may also be designed so that, in calibration, the transmitting/receiving controller 510 or the calibration signal calculator 520 outputs a calibration-use signal command CAS to the signal transmitter 300, which then generates a signal dedicated to calibration.

In normal transmission/reception by the array antenna device, the transmitting/receiving controller 510 controls the amplifiers 211 and 221, the phase shifters 212 and 222, and the operation switching switches 213 and 223 in the transmission circuit TC and reception circuit RC of each transmission/reception module 200 based on a desired control signal CS for controlling the array antenna device, to thereby perform transmission/reception control via the control of the amplitude and phase of a signal passing through the transmission circuit TC and the reception circuit RC and via the switching between transmission and reception. The switching switch 231 in each transmission/reception module 200 is controlled to switch from one of a path between the transmission circuit TC and the element antenna 100 and a path between the reception circuit RC and the element antenna 100 to the other. The control signal CS in normal operation is obtained from a reception signal received by the receiver 400 or other signals in practice.

The calibration of the array antenna device is an adjustment to bring reference amplitude values and reference phase values of the transmission circuit TC and the reception circuit RC in each transmission/reception module 200 to desired set values. A signal having passed through the transmission circuit TC for one element antenna 100 and transmitted from this element antenna 100 is calibrated based on the detection signal DS obtained after the detection signal DS is received by one element antenna 100 and passes through the reception circuit RC for this element antenna 100. The obtained detection signal DS includes, in addition to the characteristics of the transmission circuit TC and the reception circuit RC, characteristics assumed by a signal in a space between the element antenna from which the signal is transmitted and the element antenna by which the signal is received. The present invention involves obtaining in advance characteristics assumed by a signal in a space between element antennas, and storing the characteristics in the storage 530 as interconnection amplitude-phase information. The detection signal DS obtained in the calibration is corrected with the interconnection amplitude-phase information, and the corrected signal is used for the calibration.

The operation executed in calibration is described next as a feature of the present invention. The element antennas 100 in FIG. 1 are assigned symbols E01, E02, E03, and E04 for discrimination from one another. In an example illustrated in FIG. 1, the element antennas E01, E02, and E04 are transmission antennas and the element antenna E03 is a reception antenna. Accordingly, the transmission/reception switching switch 231 is connected to the transmission circuit TC in each of the transmission/reception modules 200 connected to the element antennas E01, E02, and E04, and the transmission/reception switching switch 231 is connected to the reception circuit RC in the transmission/reception module 200 connected to the element antenna E03. In this state, the transmission operation switching switches 213 for the element antennas E01, E02, and E04, which are the transmission antennas, are switched in order, to thereby obtain pieces of signal information at the receiver 400 about a signal output from the signal transmitter 300 with respect to paths "E01→E03", "E02→E03", and "E04→E03". The signal information is detected by the signal detector 420.

The array antenna usually has initial fluctuations among signal paths at the time of manufacture thereof. The signal information obtained at the signal detector 420 accordingly contains fluctuations in amplitude and in phase. An additional difference in characteristics is caused by a difference in physical distance between element antennas, for example, between the path "E01→E03" and the path "E02→E03", and the resultant difference in condition under which a signal is transmitted in space. In the case of a planar array antenna, the condition under which a signal is transmitted in space varies even when the physical distance between element antennas is the same in the case where the element antennas are aligned in different directions, for example, an electric field plane direction, a magnetic field plane direction, and an oblique direction.

The differences in characteristics due to differences in distance between element antennas and in alignment direction in a planar array antenna can be eliminated by obtaining the interconnection amplitude-phase information about connection between the element antennas 100 in advance, and correcting the detection signal DS, which contains a piece of signal information obtained at the signal detector 420, with a relevant piece of interconnection amplitude-phase information.

In FIG. 8, the interconnection amplitude-phase information 531 about connection between the element antennas 100 is stored in advance in the storage 530. The calibration signal calculator 520 corrects the detection signal DS obtained at the signal detector 420 by dividing the detection signal DS by the interconnection amplitude-phase information 531 about connection between the element antennas 100 stored in the storage 530. The calibration signal calculator 520 then calculates fluctuations among wired portions of signal paths in calibration, more specifically, portions from the input side of the distributor 310 to the element antennas 100, and calculates the calibration value CV by which the fluctuations are compensated for. The transmitting/receiving controller 510 controls the transmission/reception modules 200 based on this calibration value CV, to thereby calibrate the array antenna.

For example, when a signal S(t) having an amplitude A and a phase $\varphi$ is expressed as $S(t)=A\exp(j\varphi)$, the calibration signal calculator 520 performs division of the detection signal DS, which is complex number information indicating the amplitude A and the phase $\varphi$, by the interconnection amplitude-phase information.

The interconnection amplitude-phase information about connection between the element antennas 100 can be obtained by detaching only the element antennas 100 and testing the interconnection between feeding points of the element antennas 100 with the measuring instrument 10, which is prepared separately and illustrated in FIG. 1 as a drawing representative of the other drawings, and which is a vector network analyzer or the like. When it is difficult to conduct this test for some reason, the same data can be obtained by calculation through electromagnetic field simulation with the use of a computer (not shown).

In the description given above in which signals are transmitted from the element antennas E01, E02, and E04 in order and received by the shared element antenna E03, fluctuations in characteristics on the transmission circuit TC side of the element antennas E01, E02, and E04 are calibrated. In an example illustrated in FIG. 2 in which the element antenna E03 is a transmission antenna and the element antennas E01, E02, and E04 are reception antennas, on the other hand, the transmission-reception switching switch 231 is connected to the reception circuit RC in each of the transmission/reception modules 200 connected to the element antennas E01, E02, and E04, and the transmission-reception switching switch 231 is connected to the transmission circuit TC in the transmission/reception module 200 connected to the element antenna E03. The reception operation switching switches 223 for the element antennas E01, E02, and E04, which are the reception antennas, are then switched in order, to thereby calibrate fluctuations in characteristics on the reception circuit RC side of the reception antennas E01, E02, and E04 by the same method as the one described above with respect to paths "E03→E01", "E03→E02", and "E03→E04".

FIG. 10 is a schematic operation flow chart for illustrating an example of how an array antenna device according to the present invention operates to calibrate the transmission circuit TC. The first step is to obtain the interconnection amplitude-phase information about connection between the element antennas 100 in advance with the measuring instrument 10 or by simulation on a computer (Step S1). The obtained interconnection amplitude-phase information 531 is stored in the storage 530 of the transmission/reception controller 500 (Step S2).

Next, the transmitting/receiving controller 510 of the transmission/reception controller 500 selects an element antenna to serve as a reception antenna by following a schedule stored in advance in the storage 530, or in response to a worker's input from the HI 14 (Step S3). The calibration-use signal command CAS is then sent to the signal transmitter 300 to cause the signal transmitter 300 to generate a calibration-use signal, the transmission/reception modules 200 are controlled so that the element antenna serving as a transmission antenna is switched from one element antenna to another element antenna and transmits a signal, and the transmitted signal is received by the signal detector 420 (Step S4).

The calibration signal calculator 520 divides the detection signal DS that indicates the reception signal obtained at the signal detector 420 by a piece of interconnection amplitude-phase information about connection between the element antennas 100 in which the signal is transmitted and received, out of the interconnection amplitude-phase information stored in the storage 530, to thereby correct the detection signal DS (Step S5). The correction continues until every transmission antenna is corrected (Step S6).

The calibration signal calculator 520 next calculates fluctuations between the elements with respect to the corrected signals, and calculates the calibration value CV to be applied to the transmission circuit TC for each transmission antenna (Step S7). The calibration value CV is made up of an amplitude value and a phase value for compensating for fluctuations among the corrected signals.

The transmitting/receiving controller 510 then sets an amplitude and phase based on the calibration value CV to the transmission circuit TC of each transmission/reception module 200 for a transmission antenna (Step S8).

Second Embodiment

Figure 3:
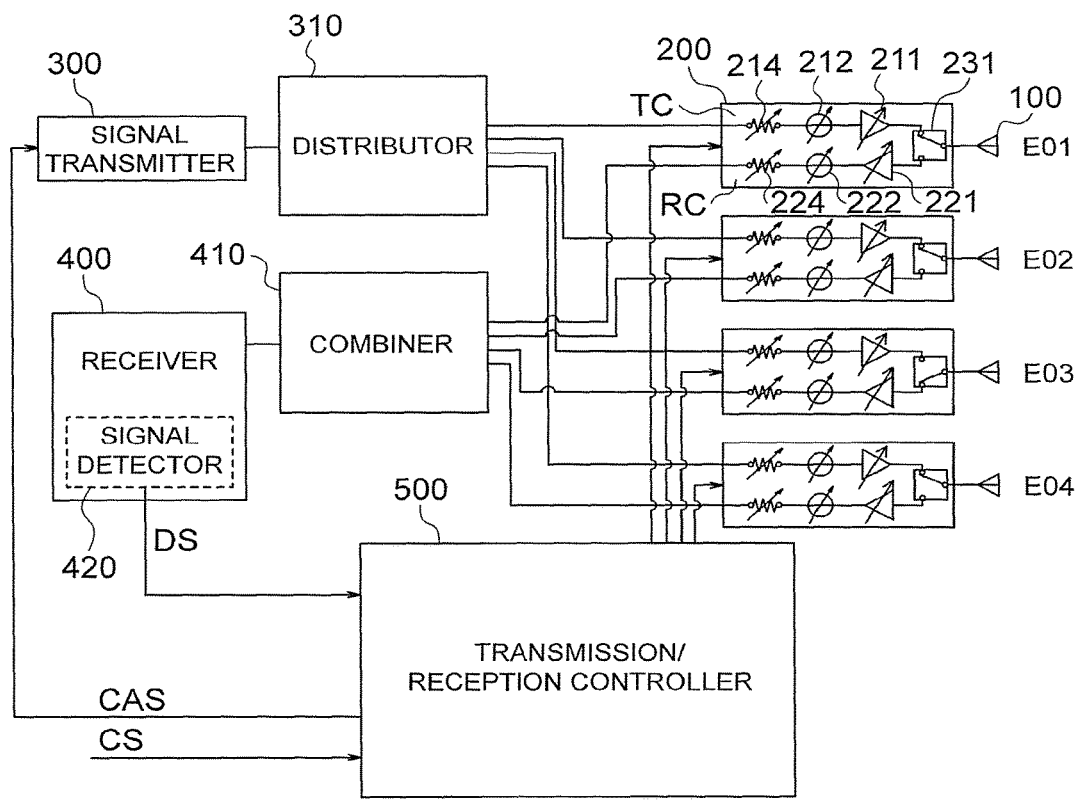
FIG. 3 is a diagram for schematically illustrating the configuration of an example of an array antenna device according to a second embodiment of the present invention.
Figure 4:
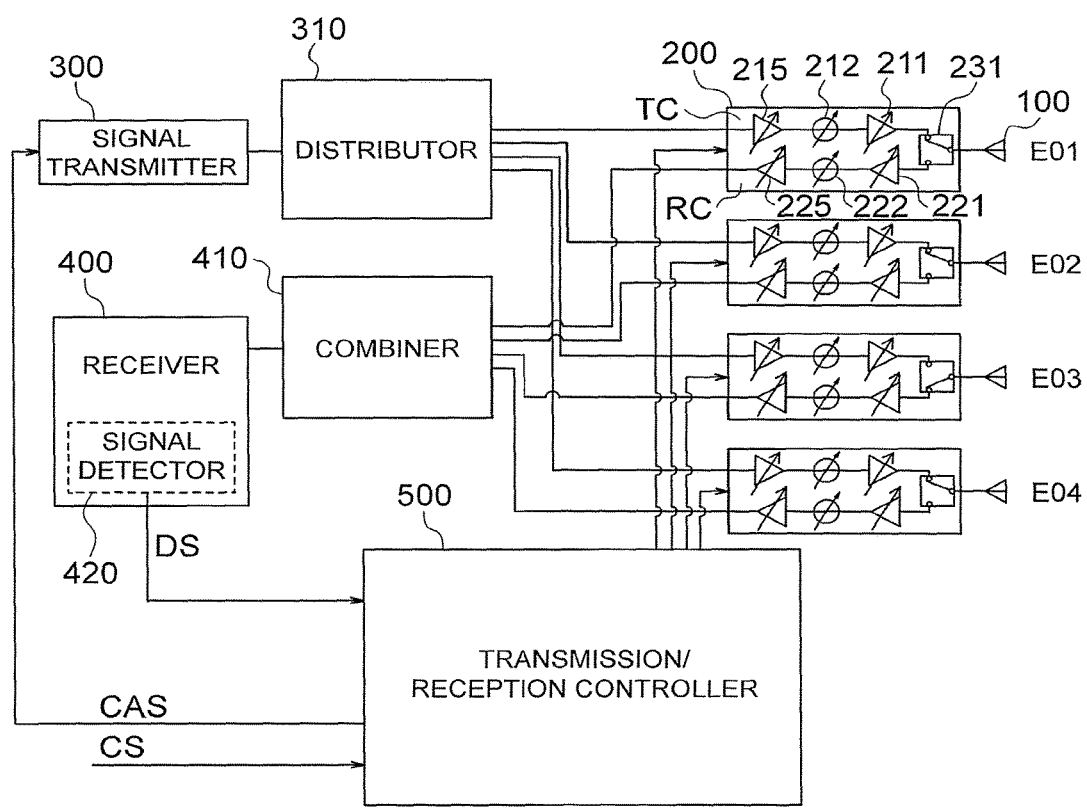
FIG. 4 is a diagram for schematically illustrating the configuration of another example of the array antenna device according to the second embodiment of the present invention.

FIG. 3 and FIG. 4 are each a diagram for schematically illustrating the configuration of an array antenna device according to a second embodiment of the present invention. The first embodiment described above uses the transmission operation switching switch 213 and the reception operation switching switch 223, which make up the operation switching switch, to switch between the operation of the transmission circuit TC and the operation of the reception circuit RC in each transmission/reception module 200. A transmission variable attenuator 214 and a reception variable attenuator 224 may be used instead as illustrated in FIG. 3. With the transmitting/receiving controller 510 of the transmission/reception controller 500, the switch between the operation of the transmission circuit TC and the operation of the reception circuit RC can be made also by adjusting the amount of attenuation of the attenuators.

A transmission variable amplifier 215 and a reception variable amplifier 225 may also be used as illustrated in FIG. 4. The switch between the operation of the transmission circuit TC and the operation of the reception circuit RC can be made also by adjusting the amplification factors of the amplifiers.

Third Embodiment

Figure 5:
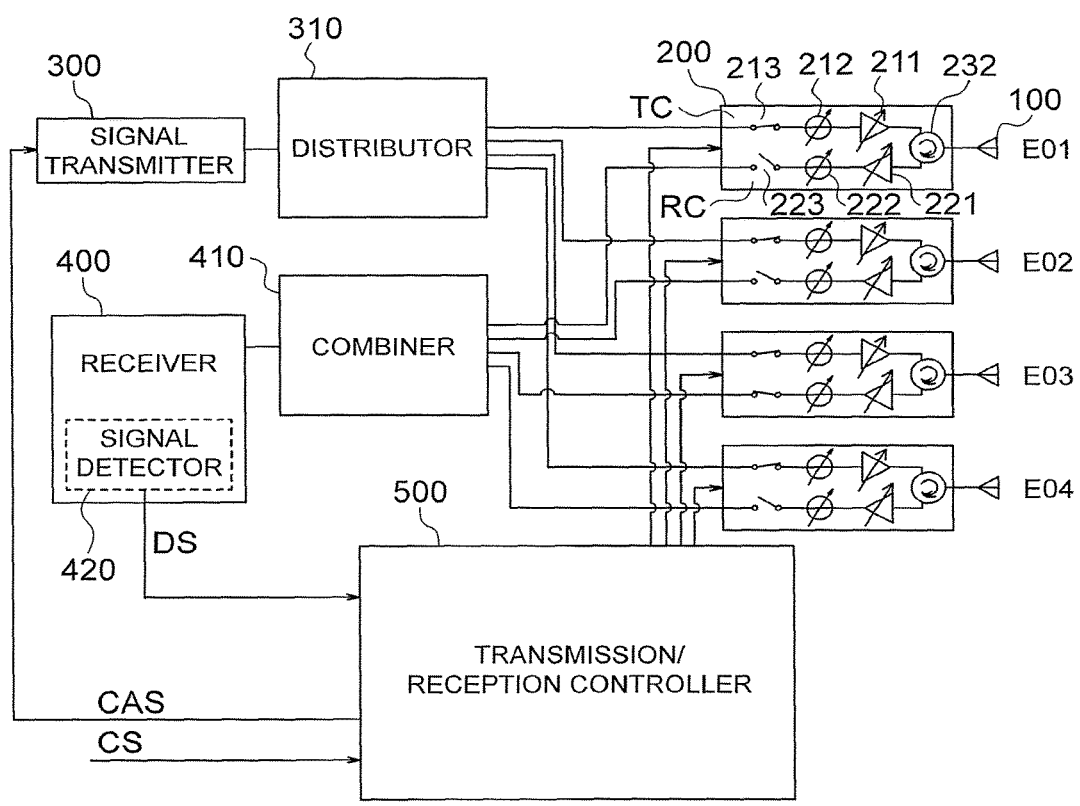
FIG. 5 is a diagram for schematically illustrating the configuration of an array antenna device according to a third embodiment of the present invention.

FIG. 5 is a diagram for schematically illustrating the configuration of an array antenna device according to a third embodiment of the present invention. The first embodiment described above uses the transmission-reception switching switch 231, which makes up the transmission-reception switching switch, to switch from one of the connection between the transmission circuit TC and the element antenna 100 and the connection between the reception circuit RC and the element antenna 100 to the other in each transmission/reception module 200. A circulator 232 may be used in place of the transmission-reception switching switch 231 as illustrated in FIG. 5.

In the example described in the first embodiment, the transmission circuit TC for the element antenna (E03) that receives a calibration signal itself is not calibrated in the calibration of the transmission circuit TC. In other words, one element antenna cannot receive, at the reception circuit RC in the transmission/reception module 200 connected to the one element antenna, a signal transmitted from the transmission circuit TC in this transmission/reception module 200. As a solution, the circulator 232 is provided to put the transmission operation switching switch 213 and the reception operation switching switch 223 for the element antenna (E03) into operation so that a signal transmitted from the element antenna (E03) is received by the element antenna (E03). The transmission circuit TC for the element antenna (E03) can thus be calibrated in relation to the transmission circuit TC for another element antenna by the same steps as those described in the first embodiment. The same applies to the reception circuit RC.

In this case, self-connection amplitude-phase information about a space in which the signal transmitted from the element antenna (E03) returns to and is received by the element antenna (E03) is used as the interconnection amplitude-phase information.

Fourth Embodiment

While the number of reception antennas is 1 in the calibration of fluctuations in characteristics on the transmission circuit TC side in the first to third embodiments, a plurality of reception antennas may be prepared. Similarly, a plurality of transmission antennas may be prepared in the calibration of fluctuations in characteristics on the reception circuit RC side, unlike the first to third embodiments, in which the number of transmission antennas is 1 in the reception-side calibration.

Steps of calibrating fluctuations in characteristics on the transmission circuit TC side with a plurality of reception antennas are described as an example. Two element antennas E02 and E03 are used as reception antennas and calibration values are calculated by the steps described above. Two calibration values are obtained as a result: a calibration value obtained for the transmission circuit TC with the use of the reception antenna E02; and a calibration value obtained for the transmission circuit TC with the use of the reception antenna E03. There are also fluctuations in the reception circuit RC for the reception antenna E02 and the reception circuit RC for the reception antenna E03, and, taking this into consideration, the following processing is executed:

Average values are calculated for amplitude calibration values and phase calibration values of the transmission circuits TC with respect to an amplitude calibration value and phase calibration value of the transmission circuit TC that are obtained by the reception antenna E02. The amplitude calibration value and the phase calibration value are then standardized by the calculated average amplitude calibration value and the calculated average phase calibration value, respectively. In this manner, the amplitude and the phase are multiplied by offsets that make the average amplitude calibration value of all transmission circuits TC and the average phase calibration value of all transmission circuits TC zero. The same calculation is performed for an amplitude calibration value and phase calibration value of the transmission circuit TC that are obtained by the reception antenna E03. The results obtained by the calculation for the transmission circuit TC with respect to the elements, namely, amplitude calibration values and phase calibration values obtained with the use of the plurality of reception antennas, are averaged separately to determine one calibration value for the transmission circuit TC.

FIG. 11 is a schematic operation flow chart for illustrating an example of how the array antenna device according to a fourth embodiment of the present invention operates to calibrate the transmission circuit TC. The same steps as those in FIG. 10 are denoted by the same symbols, and description thereof is omitted.

The transmitting/receiving controller 510 of the transmission/reception controller 500 selects a plurality of reception antennas by following a schedule stored in advance in the storage 530, or in response to a worker's input from the HI 14 (Step S'1). The transmission/reception controller 500 then executes Step S3 to Step S7 of FIG. 10 to calculate calibration values with the use of the selected reception antennas. The calibration signal calculator 520 multiplies the amplitude and the phase each by an offset so that an average value of the obtained calibration values of all transmission antennas is zero, to calculate the amplitude and phase multiplied by the offsets as calibration values (Step S'2).

The operation described above is executed for every reception antenna selected (Step S'3). Lastly, the calibration signal calculator 520 calculates, as a final calibration value CV, an average of calibration values obtained with the use of all reception antennas (Step S'4).

The calibration values obtained in Step S7 are values prior to the averaging processing as in, for example, the case in which the phases of four elements are (30°, 60°, −40°, 10°). In Step S'2, an average value of the values of Step S7 is obtained. The average value in this case is calculated as +15°. The calculated average value is used in the standardization to yield (15°, 45°, −55°, −5°). Needless to say, calibration is the act of evening out relative values, and both of the former and the latter can accordingly be used as calibration values for the four elements.

This example is used in the description of Step S'4 as well to assume that results obtained in Step S7 are (50°, 80°, −20°, 30°). In other words, it is assumed that there is a 20°-difference in characteristics between reception circuits. In Step S'2, an average value of the results, which is +35°, is used in the standardization to end up with the same values as the phases given above, namely, (15°, 45°, −55°, −5°). However, the two sets of values are never an exact match in practice due to a measurement error or other factors. Results obtained with the use of a plurality of reception elements are therefore ultimately averaged in Step S'4 to determine the average as one final calibration value.

Fluctuations in characteristics on the reception circuit RC side can similarly be calibrated with the use of a plurality of transmission antennas by replacing the switching of transmission antennas with the switching of reception antennas.

According to the fourth embodiment, the precision of calibration can be enhanced by obtaining calibration values in a dispersed manner from a plurality of systems and thus increasing the amount of information. The device configuration of the fourth embodiment also enables a device without the circulator 232 to conduct calibration of the present invention, unlike the device configuration in which the transmission-reception switching switch 231 is provided at the proximal end of each antenna and the transmission circuit TC for an element antenna that receives a calibration signal itself is not calibrated as described in the third embodiment, because another element plays that role in the device configuration of the fourth embodiment.

As described above, according to one embodiment of the present invention, there is provided an array antenna device including a plurality of element antennas (100); a transmission/reception module (200), which is provided for each of the plurality of element antennas, and includes a transmission circuit (TC), a reception circuit (RC), and a transmission-reception switching switch (231, 232); a signal transmitter (300) configured to generate a signal to be transmitted; a distributor (310) configured to distribute the signal output from the signal transmitter (300) to each transmission circuit (TC); a combiner (410) configured to combine a signal received by each reception circuit (RC); a receiver (400) configured to receive the signal combined by the combiner, the receiver including a signal detector (420) configured to detect an amplitude and phase of the received signal; and a transmission/reception controller (500) configured to: perform transmission/reception control by controlling an amplitude and phase of a signal passing through the transmission circuit (TC) and the reception circuit (RC) in each transmission/reception module based on a desired control signal (CS), and by switching between transmission and reception; and calibrate the transmission circuit (TC) and the reception circuit (RC) in amplitude and in phase based on a calibration value of the transmission/reception module, the calibration value being obtained by correcting a detection signal from the signal detector (420) with a piece of interconnection amplitude-phase information about a space between the plurality of element antennas in calibration of the transmission/reception module.

Each transmission/reception module (200) includes: the transmission circuit (TC) and the reception circuit (RC), each of which includes an amplifier (211, 221) configured to amplify a signal, a phase shifter (212, 222) configured to change a phase, and an operation switching switch (213, 214, 215, 223, 224, 225) configured to switch between operation and non-operation; and the transmission-reception switching switch (231, 232) connected at a point between the transmission circuit and one of the plurality of element antennas and between the reception circuit and the one of the plurality of element antennas, and configured to switch between transmission and reception. The transmission/reception controller (500) includes: a transmitting/receiving controller (510) configured to perform transmission/reception control by controlling each transmission/reception module in amplitude and in phase, and by switching; a storage (530) configured to store the interconnection amplitude-phase information; and a calibration signal calculator (520). In calibration of the transmission/reception module, the transmitting/receiving controller (510) puts the transmission circuit into operation to cause the transmission circuit to transmit a signal, and controls the reception circuit so that the signal is received by the reception circuit, the calibration signal calculator (520) corrects the detection signal from the signal detector (420) based on a relevant piece of the interconnection amplitude-phase information, and then obtains the calibration value for compensating for a gap from a set value, and the transmitting/receiving controller (510) calibrates the transmission circuit and the reception circuit in amplitude and in phase based on the calibration value.

Each operation switching switch (213, 214, 215, 223, 224, 225) in each transmission/reception module (200) includes a switching switch (213, 223).

Each operation switching switch (213, 214, 215, 223, 224, 225) bin each transmission/reception module (200) includes a variable attenuator (214, 224).

Each operation switching switch (213, 214, 215, 223, 224, 225) in each transmission/reception module (200) includes a variable amplifier (215, 225).

Each transmission-reception switching switch (231, 232) includes a switching switch (231).

Each transmission-reception switching switch (231, 232) includes a circulator (232).

The transmitting/receiving controller (510) is configured to put one transmission circuit into operation to cause the one transmission circuit to transmit a signal, and to put one reception circuit into operation to cause the one reception circuit to receive the signal, and the calibration signal calculator (520) is configured to use the detection signal detected by the signal detector (420) and a relevant piece of the interconnection amplitude-phase information from the storage (530) as complex numbers to correct the detection signal by dividing the detection signal by the relevant piece of the interconnection amplitude-phase information.

Calibration is conducted among a plurality of transmission circuits by putting the plurality of transmission circuits into operation with the transmitting/receiving controller (510) in order so that a signal is transmitted from one of the plurality of transmission circuits in operation, while keeping one reception circuit in operation.

Calibration is conducted among a plurality of reception circuits by putting the plurality of reception circuits into operation with the transmitting/receiving controller (510) in order so that a signal is received by one of the plurality of reception circuits in operation, while keeping one transmission circuit in operation.

Calibration is conducted among the plurality of transmission circuits (TC) by putting the plurality of transmission circuits into operation with the transmitting/receiving controller (510) in order so that a signal is transmitted from one of the plurality of transmission circuits in operation, while keeping one reception circuit (RC) in operation, and calibration is conducted among the plurality of transmission circuits by switching from one reception circuit to another reception circuit out of a plurality of reception circuits in order.

Calibration is conducted among the plurality of reception circuits by putting the plurality of reception circuits (RC) into operation with the transmitting/receiving controller (510) in order so that a signal is received by one of the plurality of reception circuits in operation, while keeping one transmission circuit (TC) in operation, and calibration is conducted among the plurality of reception circuits by switching from one transmission circuit to another transmission circuit out of a plurality of transmission circuits in order.

The calibration signal calculator (520) is configured to standardize, with an average value of calibration values, a calibration value obtained for calibration among the plurality of transmission circuits (TC) by putting one reception circuit (RC) into operation, and is configured to calculate an average of calibration values obtained with all of the plurality of reception circuits put into operation, to thereby conduct calibration among the plurality of transmission circuits.

The calibration signal calculator (520) is configured to standardize, with an average value of calibration values, a calibration value obtained for calibration among the plurality of reception circuits (RC) by putting one transmission circuit (TC) into operation, and is configured to calculate an average of calibration values obtained with all of the plurality of transmission circuits put into operation, to thereby conduct calibration among the plurality of reception circuits.

Further, there is also provided a method of calibrating an array antenna device, the array antenna device including: a plurality of element antennas (100); a transmission/reception module (200), which is connected to one of the plurality of element antennas (100), and includes a transmission circuit (TC), a reception circuit (RC), and a transmission-reception switching switch (231, 232); a transmission/reception controller (500) configured to perform control by controlling an amplitude and phase of a signal passing through the transmission circuit (TC) and the reception circuit (RC) in each transmission/reception module (200), and by switching between transmission and reception; a distributor (310) configured to distribute a signal from a signal transmitter (300) to each transmission circuit (TC) to transmit a distributed signal from the each transmission circuit (TC); a combiner (410) configured to combine a signal received by each reception circuit (RC); and a receiver (400) configured to receive the combined signal, the method including: correcting a detection signal, which contains a detected amplitude and phase of the signal received by the receiver (400), with a piece of interconnection amplitude-phase information about a space between the plurality of element antennas to obtain a calibration value in calibration of each transmission/reception module; and conducting calibration based on the calibration value.

The present invention is not limited to each of the above-mentioned embodiments, and includes all the possible combinations of those embodiments.

INDUSTRIAL APPLICABILITY

The present invention is applicable to array antenna devices in various fields.

REFERENCE SIGNS LIST 10 measuring instrument, 11 interface, 12 processor, 13 memory, 100 element antenna, 200 transmission/reception module, 211 transmission amplifier, 212 transmission phase shifter, 213 transmission operation switching switch, 214 transmission variable attenuator, 215 transmission variable amplifier, 221 reception amplifier, 222 reception phase shifter, 223 reception operation switching switch, 224 reception variable attenuator, 225 reception variable amplifier, 231 transmission-reception switching switch, 232 circulator, 300 signal transmitter, 310 distributor, 400 receiver, 410 combiner, 420 signal detector, 500a computer, 500 transmission/reception controller, 510 transmitting/receiving controller, 520 calibration signal calculator, 530 storage, 531 interconnection amplitude-phase information, RC reception circuit, TC transmission circuit

The invention claimed is:

1. An array antenna device, comprising:
a plurality of element antennas;
a transmission/reception module, which is provided for each of the plurality of element antennas, and includes a transmission circuit, a reception circuit, and a transmission-reception switching switch;
a signal transmitter configured to generate a signal to be transmitted;
a distributor configured to distribute the signal output from the signal transmitter to each transmission circuit;
a combiner configured to combine a signal received by each reception circuit;
a receiver configured to receive the signal combined by the combiner, the receiver including a signal detector configured to detect an amplitude and phase of the received signal; and
a transmission/reception controller configured to:
perform transmission/reception control by controlling an amplitude and phase of a signal passing through the transmission circuit and the reception circuit in each transmission/reception module based on a desired control signal, and by switching between transmission and reception; and
calibrate the transmission circuit and the reception circuit in amplitude and in phase based on a calibration value of the transmission/reception module, the calibration value being obtained by correcting a detection signal from the signal detector with a piece of interconnection amplitude-phase information about a space between the plurality of element antennas in calibration of the transmission/reception module.

2. The array antenna device according to claim 1, wherein each transmission/reception module includes:
the transmission circuit and the reception circuit, each of which includes an amplifier configured to amplify a signal, a phase shifter configured to change a phase, and an operation switching switch configured to switch between operation and non-operation; and
the transmission-reception switching switch to be connected at a point between the transmission circuit and one of the plurality of element antennas and between the reception circuit and the one of the plurality of element antennas, and configured to switch between transmission and reception,
wherein the transmission/reception controller includes:
a transmitting/receiving controller configured to perform transmission/reception control by controlling each transmission/reception module in amplitude and in phase, and by switching;
a storage configured to store the interconnection amplitude-phase information; and
a calibration signal calculator, and
wherein, in calibration of the transmission/reception module, the transmitting/receiving controller puts the transmission circuit into operation to cause the transmission circuit to transmit a signal, and controls the reception circuit so that the signal is received by the reception circuit, the calibration signal calculator corrects the detection signal from the signal detector based on a relevant piece of the interconnection amplitude-phase information, and then obtains the calibration value for compensating for a gap from a set value, and the transmitting/receiving controller calibrates the transmission circuit and the reception circuit in amplitude and in phase based on the calibration value.

3. The array antenna device according to claim 2, wherein each operation switching switch in each transmission/reception module includes a switching switch.

4. The array antenna device according to claim 2, wherein each operation switching switch in each transmission/reception module includes a variable attenuator.

5. The array antenna device according to claim 2, wherein each operation switching switch in each transmission/reception module includes a variable amplifier.

6. The array antenna device according to claim 2, wherein each transmission-reception switching switch includes a switching switch.

7. The array antenna device according to claim 2, wherein each transmission-reception switching switch includes a circulator.

8. The array antenna device according to claim 2,
wherein the transmitting/receiving controller is configured to put one transmission circuit into operation to cause the one transmission circuit to transmit a signal, and to put one reception circuit into operation to cause the one reception circuit to receive the signal, and
wherein the calibration signal calculator is configured to use the detection signal detected by the signal detector and a relevant piece of the interconnection amplitude-phase information from the storage as complex numbers to correct the detection signal by dividing the detection signal by the relevant piece of the interconnection amplitude-phase information.

9. The array antenna device according to claim 8, wherein calibration is conducted among a plurality of transmission circuits by putting the plurality of transmission circuits into operation with the transmitting/receiving controller in order so that a signal is transmitted from one of the plurality of transmission circuits in operation, while keeping one reception circuit in operation.

10. The array antenna device according to claim 9, wherein calibration is conducted among the plurality of transmission circuits by putting the plurality of transmission circuits into operation with the transmitting/receiving controller in order so that a signal is transmitted from one of the plurality of transmission circuits in operation, while keeping one reception circuit in operation, and calibration is conducted among the plurality of transmission circuits by switching from one reception circuit to another reception circuit out of a plurality of reception circuits in order.

11. The array antenna device according to claim 10, wherein the calibration signal calculator is configured to standardize, with an average value of calibration values, a calibration value obtained for calibration among the plurality of transmission circuits by putting one reception circuit into operation, and is configured to calculate an average of calibration values obtained with all of the plurality of reception circuits put into operation, to thereby conduct calibration among the plurality of transmission circuits.

12. The array antenna device according to claim 8, wherein calibration is conducted among a plurality of reception circuits by putting the plurality of reception circuits into operation with the transmitting/receiving controller in order so that a signal is received by one of the plurality of reception circuits in operation, while keeping one transmission circuit in operation.

13. The array antenna device according to claim 12, wherein calibration is conducted among the plurality of reception circuits by putting the plurality of reception circuits into operation with the transmitting/receiving controller in order so that a signal is received by one of the plurality of reception circuits in operation, while keeping one transmission circuit in operation, and calibration is conducted among the plurality of reception circuits by switching from one transmission circuit to another transmission circuit out of a plurality of transmission circuits in order.

14. The array antenna device according to claim 13, wherein the calibration signal calculator is configured to standardize, with an average value of calibration values, a calibration value obtained for calibration among the plurality of reception circuits by putting one transmission circuit into operation, and is configured to calculate an average of calibration values obtained with all of the plurality of transmission circuits put into operation, to thereby conduct calibration among the plurality of reception circuits.

15. A method of calibrating an array antenna device, the array antenna device including:
   a plurality of element antennas;
   a transmission/reception module, which is to be connected to one of the plurality of element antennas, and includes a transmission circuit, a reception circuit, and a transmission-reception switching switch;
   a transmission/reception controller configured to perform control by controlling an amplitude and phase of a signal passing through the transmission circuit and the reception circuit in each transmission/reception module, and by switching between transmission and reception;
   a distributor configured to distribute a signal from a signal transmitter to each transmission circuit to transmit a distributed signal from the each transmission circuit;
   a combiner configured to combine a signal received by each reception circuit; and
   a receiver configured to receive the combined signal, the method comprising:
   correcting a detection signal, which contains a detected amplitude and phase of the signal received by the receiver, with a piece of interconnection amplitude-phase information about a space between the plurality of element antennas to obtain a calibration value in calibration of each transmission/reception module; and
   conducting calibration based on the calibration value.

* * * * *